United States Patent
Gibson et al.

(10) Patent No.: US 9,656,657 B2
(45) Date of Patent: May 23, 2017

(54) CONTROLLING A CLUTCH BETWEEN AN ENGINE AND AN ELECTRIC MACHINE IN A HYBRID VEHICLE

(71) Applicant: FORD GLOBAL TECHNOLOGIES, LLC, Dearborn, MI (US)

(72) Inventors: Alexander O'Connor Gibson, Ann Arbor, MI (US); Felix Nedorezov, Rochester Hills, MI (US); Xiaoyong Wang, Novi, MI (US); Matthew John Shelton, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 272 days.

(21) Appl. No.: 14/511,469

(22) Filed: Oct. 10, 2014

(65) Prior Publication Data

US 2016/0101769 A1    Apr. 14, 2016

(51) Int. Cl.
*B60W 20/00* (2016.01)
*F16D 48/06* (2006.01)
*B60K 6/48* (2007.10)

(52) U.S. Cl.
CPC .............. *B60W 20/00* (2013.01); *B60K 6/48* (2013.01); *F16D 48/06* (2013.01); *F16D 48/066* (2013.01); *F16D 2500/1026* (2013.01); *F16D 2500/1066* (2013.01); *F16D 2500/10412* (2013.01); *F16D 2500/1107* (2013.01); *F16D 2500/3062* (2013.01); *F16D 2500/3065* (2013.01); *F16D 2500/30421* (2013.01); *F16D 2500/70406* (2013.01); *Y10S 903/946* (2013.01)

(58) Field of Classification Search
CPC ..................................................... B60W 20/40
See application file for complete search history.

(56) References Cited

U.S. PATENT DOCUMENTS

| | | | |
|---|---|---|---|
| 6,334,079 B1 | 12/2001 | Matsubara et al. | |
| 8,740,744 B2 | 6/2014 | Grutter et al. | |
| 2011/0165992 A1 | 7/2011 | Ueno et al. | |
| 2013/0053214 A1* | 2/2013 | Kawai | B60W 10/02 477/5 |
| 2013/0292223 A1 | 11/2013 | Nedorezov et al. | |
| 2013/0296100 A1 | 11/2013 | Nefcy et al. | |

* cited by examiner

*Primary Examiner* — Derek D Knight
(74) *Attorney, Agent, or Firm* — David B. Kelley; Brooks Kushman P.C.

(57) ABSTRACT

A parallel hybrid vehicle includes an engine and a motor separated along a driveshaft by a clutch. The motor can operate (either alone or in combination with the engine) to provide positive drive torque to the wheels. The motor can also act as a generator and provide negative torque when converting mechanical energy from the driveshaft into mechanical energy to be stored in a battery. The clutch selectively couples the motor to the engine. Torque and its effects on the clutch can vary dramatically when the motor changes from providing positive and negative torque, and vice versa, while the engine is running. At least one controller in the vehicle is programmed to, while the engine is running, initiate an increase in pressure at the clutch in response to an anticipated change in torque provided by the motor from positive to negative or from negative to positive.

18 Claims, 2 Drawing Sheets

CONTROLLING A CLUTCH BETWEEN AN ENGINE AND AN ELECTRIC MACHINE IN A HYBRID VEHICLE

TECHNICAL FIELD

The present disclosure generally relates to controlling a clutch that selectively couples an engine and an electric machine in a hybrid electric vehicle. More specifically, the present disclosure relates to controlling the clutch during moments when the torque provided by the electric machine changes from positive to negative and from negative to positive.

BACKGROUND

Hybrid electric vehicles (HEVs) include both an engine and at least one electric motor to provide drive torque to the wheels. There are various types of HEVs. For example, "parallel" hybrid vehicles typically include clutches that selectively enable either or both the engine and the motor to provide drive torque. A "series" hybrid vehicle typically includes an electric motor that is always driveably connected to the road wheels, and an engine that is not mechanically connected to the wheels. In other words, the engine does not provide any of the torque required to propel the vehicle. Rather, in a "series" hybrid vehicle, the engine powers a generator to produce electrical energy that is stored in the battery and/or used by the motor.

One particular type of parallel hybrid vehicle includes an engine and a motor separated along a driveshaft by a clutch. The motor can operate (either alone or in combination with the engine) to provide positive drive torque to the wheels. The motor can also act as a generator and provide negative torque when converting mechanical energy from the driveshaft into mechanical energy to be stored in a battery. This negative torque can be applied when, for example, the engine is running and the clutch is at least partially engaged to connect the engine to the motor. During changes in operational mode of the motor, forces on the clutch can vary drastically and quickly.

SUMMARY

According to one embodiment, a vehicle comprises an engine, an electric machine, a clutch, and at least one controller. The electric machine is configured to provide positive (e.g., drive) torque and negative (e.g., electric-generating) torque. The clutch is operable by hydraulic pressure to selectively couple the engine and the electric machine. The at least one controller is programmed to, while the engine is running, increase the hydraulic pressure in response to an anticipated change in torque provided by the electric machine from positive to negative.

According to another embodiment, a method of controlling a hybrid vehicle comprises while an engine is running, increasing hydraulic pressure at a clutch that selectively couples the engine to a motor/generator in response to an anticipated change in sign of torque provided by the motor/generator.

According to yet another embodiment, a vehicle comprises an engine, and electric machine, and a clutch configured to selectively couple the engine to the electric machine. At least one controller is programmed to, while the engine is running, initiate an increase in clutch pressure a period of time prior to the electric machine changing from providing drive torque to generating electric power.

An anticipated change in torque provided by the electric machine (motor/generator) from positive to negative can be realized when, for example, (i) the state of charge (SOC) of the battery is less than a first predetermined first charge threshold, indicating a desire to charge the battery, (ii) the SOC is less than a second higher predetermined charge threshold, and (iii) if requested brake torque is greater than a predetermined brake torque threshold.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
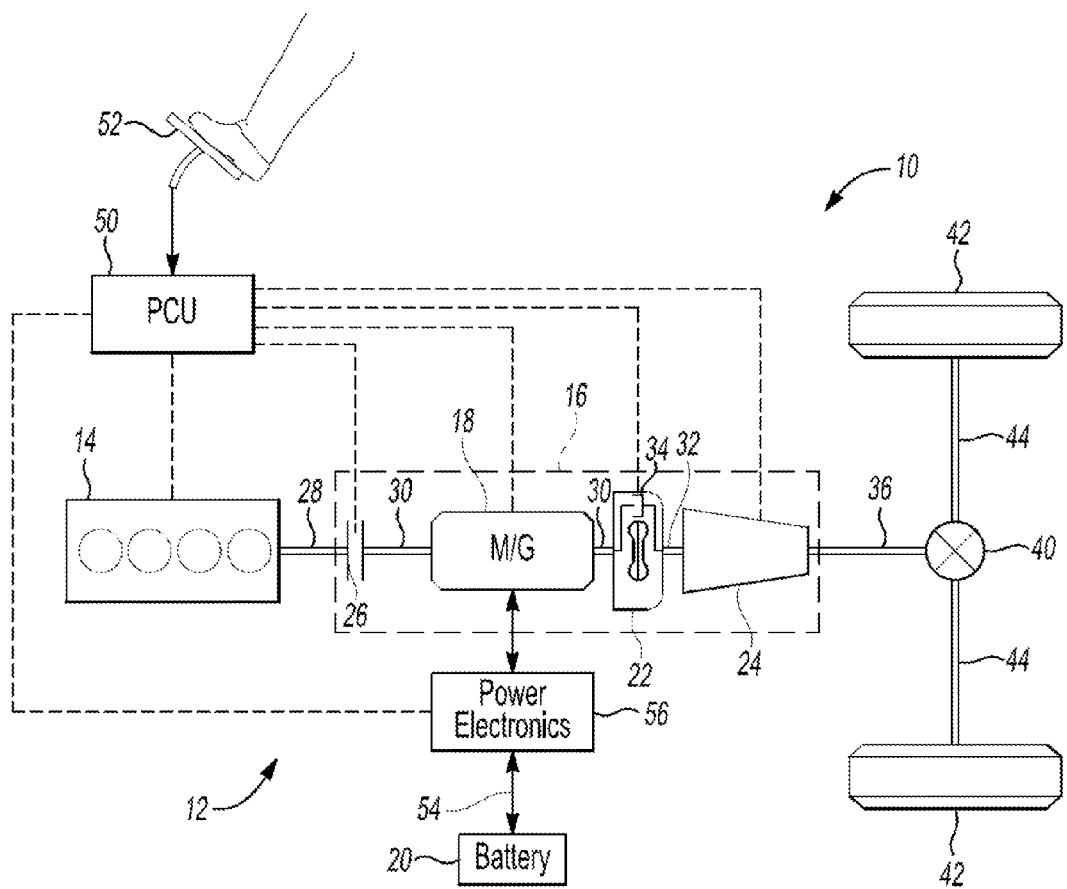
FIG. 1 is a schematic of a hybrid electric vehicle according to one embodiment.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch or hydraulic pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20. In either of these situations, it can be said that the M/G 18 is providing negative torque such that it is reducing (or not increasing) the overall torque transferred to the wheels. When the M/G 18 is operating as a motor and providing torque to the wheels, it can be said that the M/G 18 is providing positive torque.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

When the M/G 18 is operating as a generator and is providing negative torque while the engine is running, the torque across the disconnect clutch 26 can increase significantly. The torque across the disconnect clutch 26 can be represented by Equation (1) below:

$$T_{DC} = T_{eng} - (T_{MG} - T_{BPC} - T_{IMP}) - I_r \dot{\omega}_r \qquad (1)$$

where $I_r$ is the total inertia attached to the rotor of the M/G 18, including torque converter impeller and disconnect clutch inertia terms, $\dot{\omega}_r$ is the acceleration of the rotor of the M/G, $T_{eng}$ is the torque provided by the engine, $T_{DC}$ is the torque across the disconnect clutch 26, $T_{MG}$ is the M/G torque which can be positive or negative depending upon whether the M/G is in positive torque mode (i.e. providing positive torque to the transmission input) or negative torque/generating mode (i.e. generating a negative or braking torque when in generating mode to generate current to recharge the hybrid battery), $T_{BPC}$ is the torque converter bypass clutch torque, and $T_{IMP}$ is the torque converter impeller torque.

If the acceleration of the rotor of the M/G 18 is relatively small and the torque converter bypass clutch 34 is open, the torque across the disconnect clutch 26 can be approximated by Equation (2) below:

$$T_{DC} = T_{eng} - T_{MG} \qquad (2)$$

When the M/G 18 is in a positive torque mode, the M/G torque reduces, or does not increase, the torque across the disconnect clutch 26. When the M/G 18 is in a negative torque mode, the sign of $T_{MG}$ is negative, leading to a significant increase in the torque across the disconnect clutch. To prevent clutch slip, a similarly large increase disconnect clutch holding capacity is required.

Oftentimes the M/G 18 can act as a generator in the negative torque mode even as the engine 14 is running, continuing to provide positive drive torque when the disconnect clutch 26 is closed. This may occur when, for example, the state of charge of the battery 20 is low and the vehicle is operating in an idle or creep mode. At certain times, when the M/G 18 is acting as a generator and the engine is running, the disconnect clutch may slip. Extended continuous slip would damage the friction material in the disconnect clutch 26. The disconnect clutch 26 must therefore be controlled to account for such changes in torque across the disconnect clutch 26.

Actuation of control of the disconnect clutch 26 can be accomplished by controlling hydraulic pressures that actuate friction materials, for example. This can be accomplished in various other fashions, such as, for example, electrical or mechanical actuators, spring-biased pressure plates that are released when subjected to air or hydraulic fluids, or other such methods. When friction materials in the disconnect clutch 26 are "pressed" together such that the two sides of the clutch mechanism at least partially rotate together, this can be referred to as "clutch pressure" being applied to the disconnect clutch 26.

According to many contemplated aspects of the present disclosure, a control strategy is provided to increase the disconnect clutch capacity or clutch pressure while the engine is running at the moment (or just before) the M/G begins providing negative torque. The controller(s) described above can be specifically programmed to alter the pressure at the disconnect clutch to increase the clutch capacity to inhibit unnecessary slipping in the disconnect clutch when the M/G begins operating as a generator with the engine on.

Figure 2:
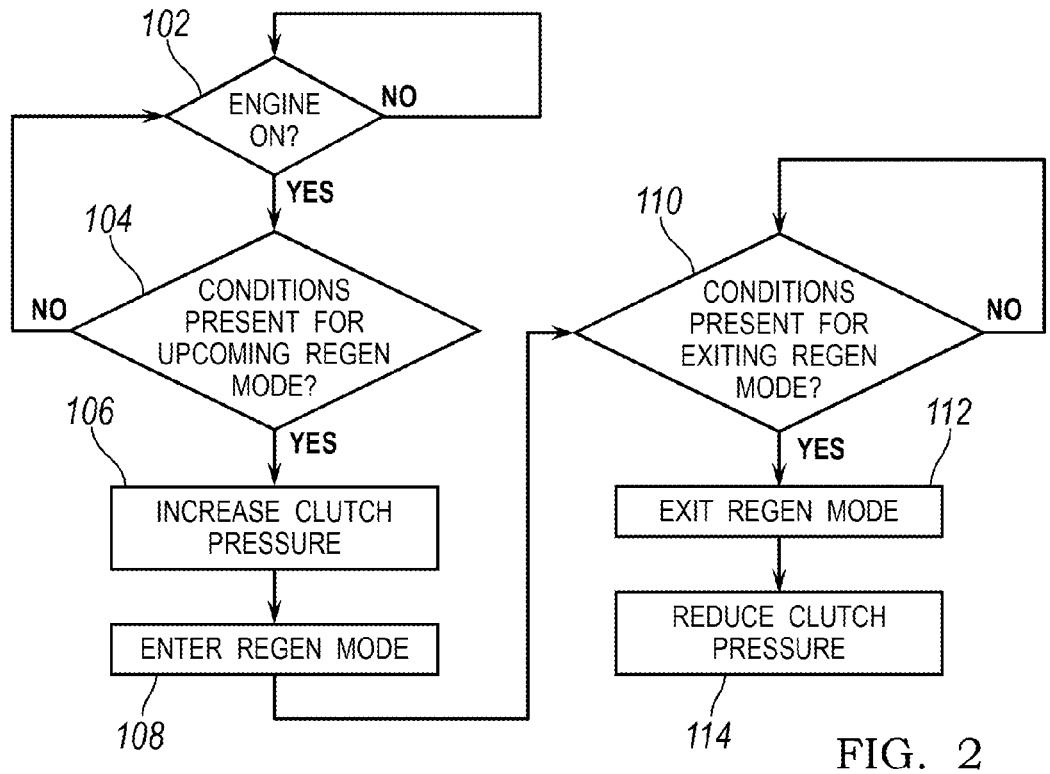
FIG. 2 is a flow chart illustrating one embodiment of an algorithm implemented by at least one controller to control the clutch.

Referring to FIG. 2, an exemplary algorithm is illustrated that can be implemented by at least one controller. At 102, the controller determines whether the engine is "on" or "running" In other words, the controller determines whether the crankshaft is spinning, has some torque output due to combustion, or if the engine is otherwise actively participating in providing torque toward the disconnect clutch. It is during these times when the engine is on that slip across the disconnect clutch slip can occur due to the magnitude of torque being provided to the disconnect clutch from the engine relative to the amount of torque that can be withheld by the clamping pressures in the clutch.

If the engine is running, and assuming the M/G is already running as a motor or otherwise not providing negative torque, then at 104 the processor determines if conditions are present for the M/G to begin providing negative torque (e.g., change from operating as a motor to operating as a generator).

Various methods are contemplated in order to determine if conditions are present for an upcoming or anticipated change in operating state of the M/G. For example, the controller may receive a signal indicating the operator of the vehicle depressing the brake pedal. In response to the brake pedal being depressed, the controller can determine receive a signal indicating the state of charge (SOC) of the battery. The M/G will begin generating electric power (or continue doing so) if (i) the SOC of the battery is less than a first predetermined first charge threshold ($SOC_{regen\_max\_low}$) indicating a desire to charge the battery, (ii) the SOC is less than a second higher predetermined charge threshold ($SOC_{regen\_max\_high}$), and (iii) if requested brake torque is greater than a predetermined brake torque threshold. These three conditions may be present immediately prior to (e.g., within a fraction of a second; a millisecond) the M/G switching from providing drive torque to generating electric power. These three conditions indicate a definite period of time prior to the torque switch in the M/G.

If these conditions are met, or other such conditions (as discussed below) that would indicate an anticipated supply of negative torque from the M/G, then the pressure at the disconnect clutch is increased at 106. The increasing of the clutch pressure can be done via increasing the hydraulic pressure, forces behind mechanical engagements in the clutch, or other such methods described above that increasing the pressing force between two or more parts in the disconnect clutch. In one preferred embodiment, the transmission hydraulic circuit line pressure is increased by sending a command to the transmission line pressure control solenoid to increase the pressure from the current value to a high value (e.g., from a normal value of 60 PSI to a higher value of 100-150 PSI). This increases the capacity of the disconnect clutch to withstand increased forces on either side of the clutch without slipping. By commanding such an increase in clutch pressure, the disconnect clutch capacity is increased just prior to an upcoming change in operational mode of the M/G from acting as a motor (or free spinning) to acting as a generator.

It should be understood that other methods strategies are contemplated for detecting an upcoming supply of negative torque by the M/G. For example, the controller can monitor the rate of change of the torque provided by the M/G, and correspondingly increase the disconnect clutch pressure if the rate of change of the torque is a negative value above a threshold (indicating the torque of the M/G is approaching zero). Other embodiments are contemplated and should be considered within the scope of the present disclosure as sufficient methods for determining whether an upcoming change in torque (e.g., from positive to negative) will occur in the M/G.

Once the clutch pressure has been commanded to increase, the M/G enters regenerative mode at 108 in which it provides negative torque by converting mechanical energy into electric energy for storage in the battery. The M/G can continue to rotate in the same direction as the engine so that both power sources are rotating together synchronously across the disconnect clutch. With the increased pressure and capacity at the disconnect clutch, slipping of the disconnect clutch is inhibited.

While the M/G is operating as a generator and the clutch pressure is at its elevated level, the clutch pressure can be controlled as a function of M/G torque (Equation 2 above). The clutch pressure can also be controlled as a function of the torque across the torque converter bypass clutch, the torque converter impeller torque, and/or the acceleration of the rotor of the M/G (Equation 1 above).

In short, steps 106 and 108 assure that when the engine is running, the line pressure to the disconnect clutch is controlled to increase to a higher value just prior to (or at the same time as) the beginning of the M/G operating as a generator. This inhibits clutch slip during the torque change from positive (or zero) to negative. Extended continuously slip that would otherwise damage the disconnect clutch friction material during this moment of large and sudden inputs of negative torque is thereby inhibited.

While increasing the clutch pressure is an effective means of increasing the clutch holding capacity, parasitic losses can increase if this is done for an extended periods of time. The losses can increase according to the hydraulic line pressure multiplied by the fluid pump rate ($\Delta P_{line} * Q_{pump}$). Therefore the clutch pressure can be reduced when exiting the M/G regenerative mode.

For example, at 110 the controller determines whether conditions are present for the M/G exiting the regenerative mode and cease providing negative torque. This can be done in fashions similar to (but opposite of) the methods of step 104 described above. Once the M/G ceases providing negative torque at 112, the clutch pressure can reduce to its normal, lower pressure value. This reduction of the clutch pressure can occur automatically since the clutch pressure may be controlled as a function of the M/G generator torque and/or the bypass clutch torque, impeller torque, and rotor torque, as described above.

Figure 3:
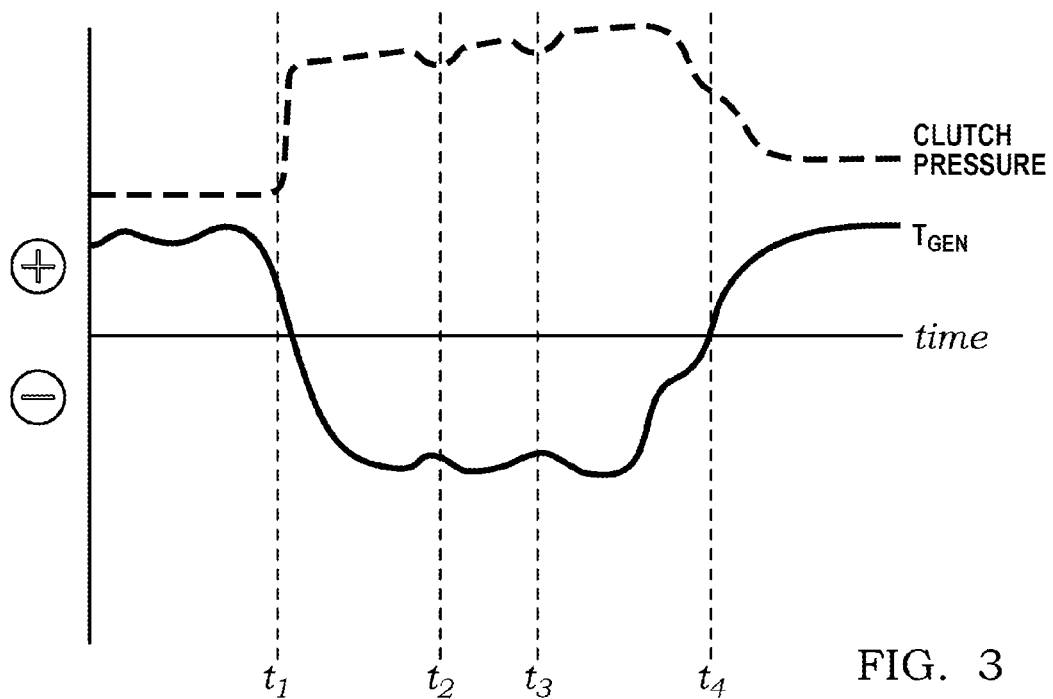
FIG. 3 is a graphical representation of torque produced by the electric machine and pressure at a clutch that separates the electric machine from an engine in a vehicle.

FIG. 3 illustrates a graphical relationship between clutch pressure and torque provided by the M/G over time according to one exemplary vehicle utilizing the control strategy described above. Prior to $t_1$, the disconnect clutch pressure is at its normal operational amount as positive torque is provided from the M/G in assisting the engine in propelling the vehicle. At $t_1$, the controller determines an upcoming change in operation of the M/G, as the M/G will soon begin providing negative torque. In response to a determined upcoming change in sign of torque provided by the M/G, the clutch pressure increases to an amount higher than the normal operational amount. The clutch pressure reaches this heightened amount prior to the torque of the M/G changing from positive to negative. With the increased clutch pressure, the disconnect clutch is able to withstand torque bursts or disturbances from either or both of the engine and M/G during the sign change.

After $t_1$, the controller controls the clutch pressure as function of M/G torque (Equation 2 above). The clutch pressure can also be controlled as a function of the torque across the torque converter bypass clutch, the torque converter impeller torque, and/or the acceleration of the rotor of the M/G (Equation 1 above). This is illustrated at $t_2$ and $t_3$ as examples of slight decreases of negative torque being provided by the M/G, causing corresponding decreases in clutch pressure. Between $t_3$ and $t_4$, the clutch pressure remains controlled as a function of these exemplary parameters. The controller also determines that an upcoming change in sign of torque provided by the M/G (i.e., from negative to positive). The change in sign is shown at $t_4$. In response to this change in sign, the clutch pressure can ramp down toward its normal operational amount, similar to the amount of clutch pressure provided prior to $t_1$.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
an engine;
an electric machine configured to provide positive and negative torque;
a clutch operable by hydraulic pressure to selectively couple the engine and the electric machine; and
at least one controller programmed to, while the engine is running, increase the hydraulic pressure in response to an anticipated change in torque provided by the electric machine from positive to negative.

2. The vehicle of claim 1, wherein the at least one controller is further programmed to subsequently increase the hydraulic pressure based at least upon an amount of negative torque provided by the electric machine.

3. The vehicle of claim 2, further comprising a torque converter and an associated bypass clutch, wherein the at least one controller is further programmed to increase the hydraulic pressure based at least upon an amount of torque transmitted through the bypass clutch.

4. The vehicle of claim 2, further comprising a torque converter having an impeller, wherein the at least one controller is further programmed to increase the hydraulic pressure based at least upon an amount of torque transmitted through the impeller.

5. The vehicle of claim 2, wherein the electric machine includes a rotor and wherein the at least one controller is further programmed to increase the hydraulic pressure based at least upon an amount of acceleration of the rotor.

6. The vehicle of claim 1, wherein the at least one controller is further programmed to subsequently decrease the hydraulic pressure in response to an anticipated change in torque provided by the electric machine from negative to positive.

7. The vehicle of claim 1, wherein the at least one controller is further programmed to subsequently decrease the hydraulic pressure in response to a change in torque provided by the electric machine from negative to positive.

8. A method of controlling a hybrid vehicle comprising:
while an engine is running, increasing hydraulic pressure at a clutch that selectively couples the engine to a motor/generator in response to an anticipated change in sign of torque provided by the motor/generator.

9. The method of claim 8, wherein the change in sign is from positive to negative.

10. The method of claim 9, further comprising decreasing the hydraulic pressure at the clutch in response to an anticipated change in sign of torque provided by the motor/generator from negative to positive.

11. The method of claim 9, further comprising decreasing the hydraulic pressure at the clutch in response to a change in sign of torque provided by the motor/generator from negative to positive.

12. The method of claim 8, wherein the increasing includes increasing the hydraulic pressure at the clutch based on an amount of torque transmitted by the motor/generator.

13. The method of claim 8, further comprising, subsequent to the change in sign of the torque provided by the motor/generator, modulating the hydraulic pressure based on an amount of torque transmitted by the motor/generator.

14. The method of claim 13, wherein the modulating includes modulating the hydraulic pressure based on an amount of negative torque transmitted by the motor/generator.

15. A vehicle comprising:
an engine;
an electric machine;
a clutch configured to selectively couple the engine to the electric machine; and
at least one controller programmed to, while the engine is running, initiate an increase in clutch pressure a period of time prior to the electric machine changing from providing drive torque to generating electric power, wherein the at least one controller is further programmed to initiate a decrease in clutch pressure a period of time prior to the electric machine ceasing to generate electric power.

16. The vehicle of claim 15, wherein the at least one controller is further programmed to initiate a decrease in the clutch pressure a period of time prior to the electric machine changing from generating electric power to providing drive torque.

17. The vehicle of claim 15, wherein the at least one controller is further programmed to, while the electric machine is generating electric power, increase the clutch pressure based at least upon an amount of torque transmitted by the electric machine.

18. The vehicle of claim 15, wherein the electric machine includes a rotor, and wherein the at least one controller is further programmed to, while the electric machine is generating electric power, increase the clutch pressure based at least upon an amount of acceleration of the rotor.

* * * * *